US011382304B2

(12) United States Patent
Partlow (10) Patent No.: US 11,382,304 B2
(45) Date of Patent: Jul. 12, 2022

(54) PET PEE PAD PEN ASSEMBLY (71) Applicant: Toni Partlow, Fairfax, VA (US)

(72) Inventor: Toni Partlow, Fairfax, VA (US)

(*) Notice: Subject to any disclaimer, the term of this patent is extended or adjusted under 35 U.S.C. 154(b) by 110 days.

(21) Appl. No.: 17/023,976

(22) Filed: Sep. 17, 2020

(65) Prior Publication Data
US 2022/0079110 A1 Mar. 17, 2022

(51) Int. Cl.
A01K 1/015 (2006.01)
A01K 1/01 (2006.01)
A01K 1/03 (2006.01)

(52) U.S. Cl.
CPC .......... A01K 1/0157 (2013.01); A01K 1/0107 (2013.01); A01K 1/033 (2013.01)

(58) Field of Classification Search
CPC .... A01K 1/0157; A01K 1/0107; A01K 1/033; A01K 1/0017; A01K 1/011; A01K 1/015; A01K 1/0236; A01K 1/0245; A01K 1/03; A01K 1/034; A01K 1/031; A01K 31/002; A01K 31/005; A01K 31/007; E06B 11/02; E06B 11/023; E06B 11/025
See application file for complete search history.

(56) References Cited

U.S. PATENT DOCUMENTS

| 2,932,279 | A | | 4/1960 | Giles | |
|---|---|---|---|---|---|
| 4,224,899 | A | | 9/1980 | Cruchelow | |
| 5,184,575 | A | | 2/1993 | Reinartz | |
| D335,002 | S | | 4/1993 | Read | |
| 5,233,939 | A | * | 8/1993 | Randolph | A01K 1/0613 119/752 |
| 5,950,566 | A | * | 9/1999 | Ricketts | A01K 1/0613 119/473 |
| 6,092,488 | A | * | 7/2000 | Allawas | A01K 1/0245 119/497 |
| 6,550,423 | B1 | * | 4/2003 | Pope | A01K 1/0107 119/169 |
| 8,267,048 | B2 | * | 9/2012 | Flannery | A01K 1/033 119/498 |
| 8,408,416 | B2 | * | 4/2013 | Cheng-Lung | A01K 1/033 220/666 |
| 8,622,023 | B1 | * | 1/2014 | Tierney | A01K 1/0107 119/165 |
| 8,985,058 | B2 | * | 3/2015 | Cantwell | A01K 1/03 119/501 |
| 9,521,826 | B2 | | 12/2016 | Rybka | |
| 9,980,461 | B2 | * | 5/2018 | Kim | A01K 1/033 |
| 10,709,105 | B1 | * | 7/2020 | Edmonds | A01K 1/029 |

(Continued)

FOREIGN PATENT DOCUMENTS

FR 2731317 A1 * 9/1996 ........... A01K 1/0107
KR 20180101138 A * 9/2018 ........... A01K 1/0107

Primary Examiner — Trinh T Nguyen (57) ABSTRACT

A pet pee pad pen assembly includes a pen which comprises a plurality of walls being hingedly coupled together. In this way the pen forms a rectangular shape to shelter an animal. A respective one of the walls has a plurality of openings each extending therethrough to facilitate the animal to enter or exit the pen. A base is provided that can be positioned on a support surface and the pen is positioned on the base. A pad is positionable on the base and the pad is comprised of a fluid absorbent material to absorb the pet urine. An insert is positionable on the pad thereby inhibiting the pad from being displaced on the base.

7 Claims, 6 Drawing Sheets (56) References Cited

U.S. PATENT DOCUMENTS

| | | | |
|---|---|---|---|
| 2001/0025910 A1* | 10/2001 | Olivadoti | A01K 1/0107 |
| | | | 248/346.01 |
| 2006/0201437 A1 | 9/2006 | Ryan | |
| 2007/0186866 A1 | 8/2007 | Shibles | |
| 2008/0245313 A1* | 10/2008 | Jakubowski | A01K 1/0245 |
| | | | 119/497 |
| 2010/0282179 A1* | 11/2010 | Ho | A01K 1/03 |
| | | | 119/455 |
| 2010/0300367 A1 | 12/2010 | Askinasi | |
| 2011/0030619 A1* | 2/2011 | Blackstone | A01K 1/0107 |
| | | | 119/527 |
| 2012/0312242 A1* | 12/2012 | Hillman | A01K 1/0125 |
| | | | 119/169 |
| 2020/0053977 A1* | 2/2020 | Newman | A01K 1/034 |

\* cited by examiner

PET PEE PAD PEN ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to pen devices and more particularly pertains to a new pen device for facilitating an animal to relieve themselves in a variety of locations over an extended period.

(2) Description of Related Art Including Information Disclosed Under 37 CFR 1.97 and 1.98

The prior art relates to pen devices including a box shelter that has separate rooms therein for housing an animal. The prior art discloses an animal house that includes swinging doors and a ramp. The prior art discloses a pet patio which is attachable to a window of a dwelling to facilitate a pet to access the pet patio through the window. The prior art further discloses an automated pet enclosure that is mounted to a window of a dwelling to facilitate a pet to access the enclosure through the window.

BRIEF SUMMARY OF THE INVENTION

An embodiment of the disclosure meets the needs presented above by generally comprising a pen which comprises a plurality of walls being hingedly coupled together. In this way the pen forms a rectangular shape to shelter an animal. A respective one of the walls has a plurality of openings each extending therethrough to facilitate the animal to enter or exit the pen. A base is provided that can be positioned on a support surface and the pen is positioned on the base. A pad is positionable on the base and the pad is comprised of a fluid absorbent material to absorb the pet urine. An insert is positionable on the pad thereby inhibiting the pad from being displaced on the base.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
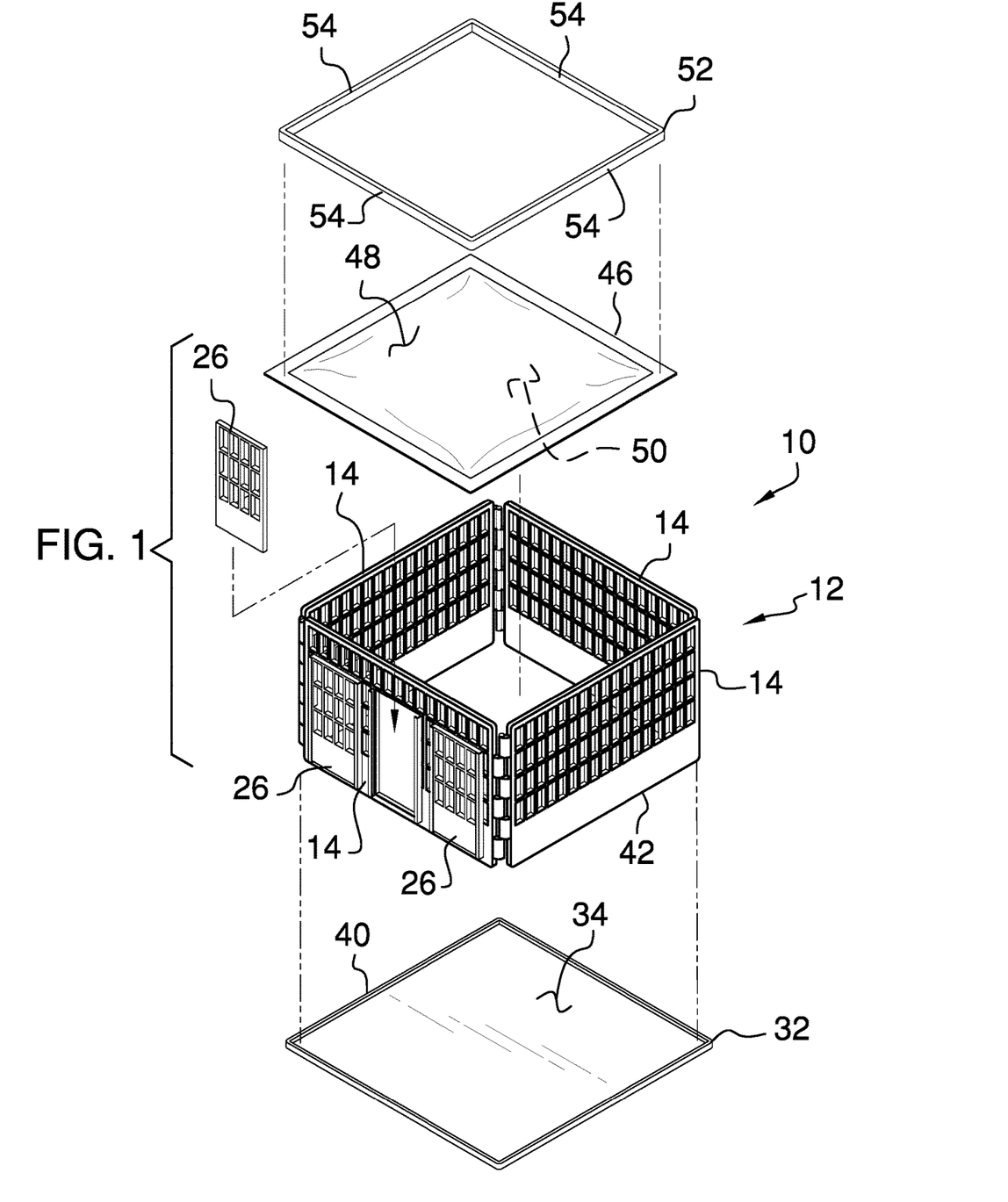
FIG. 1 is an exploded perspective view of a pet pee pad pen assembly according to an embodiment of the disclosure.
Figure 2:
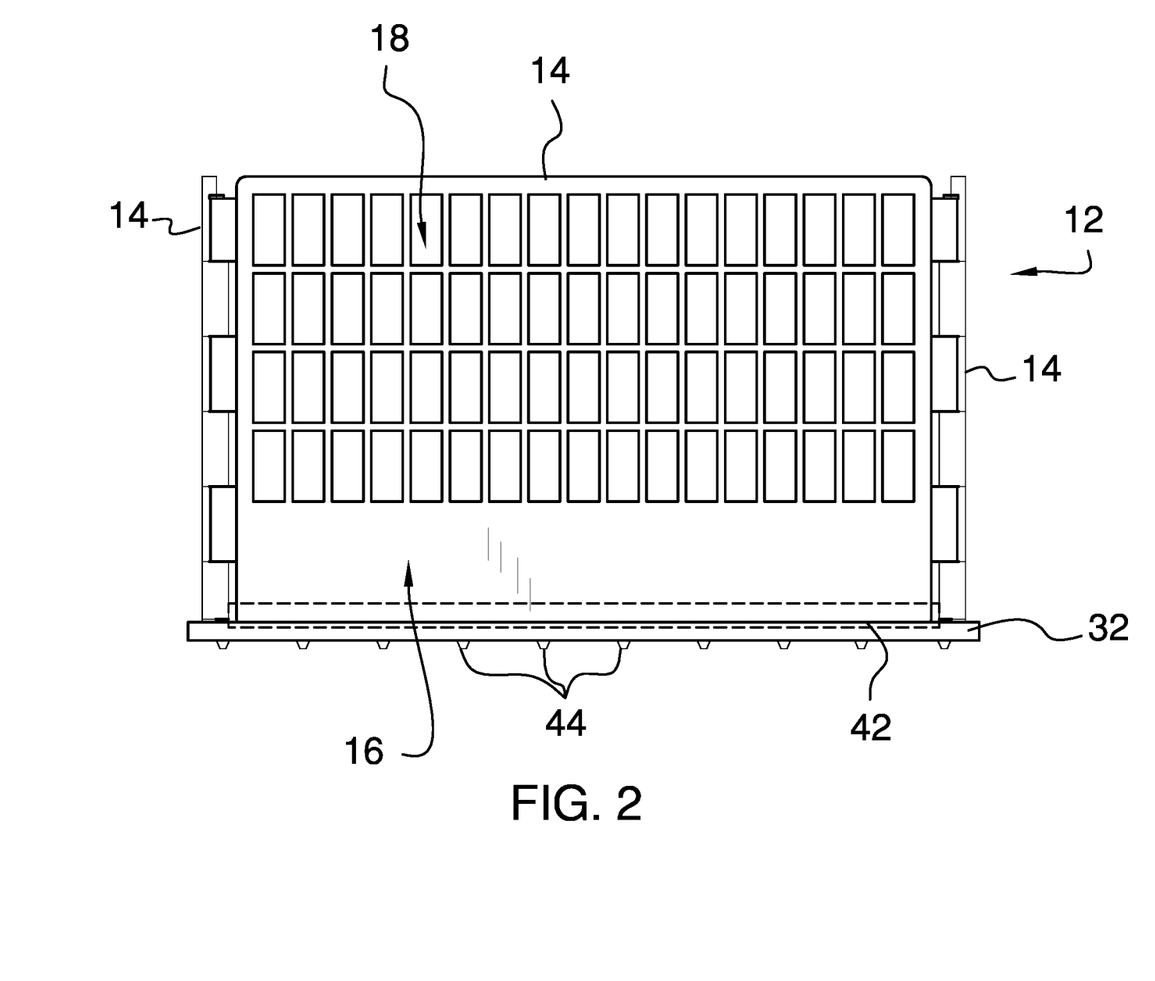
FIG. 2 is a right side phantom view of an embodiment of the disclosure.
Figure 3:
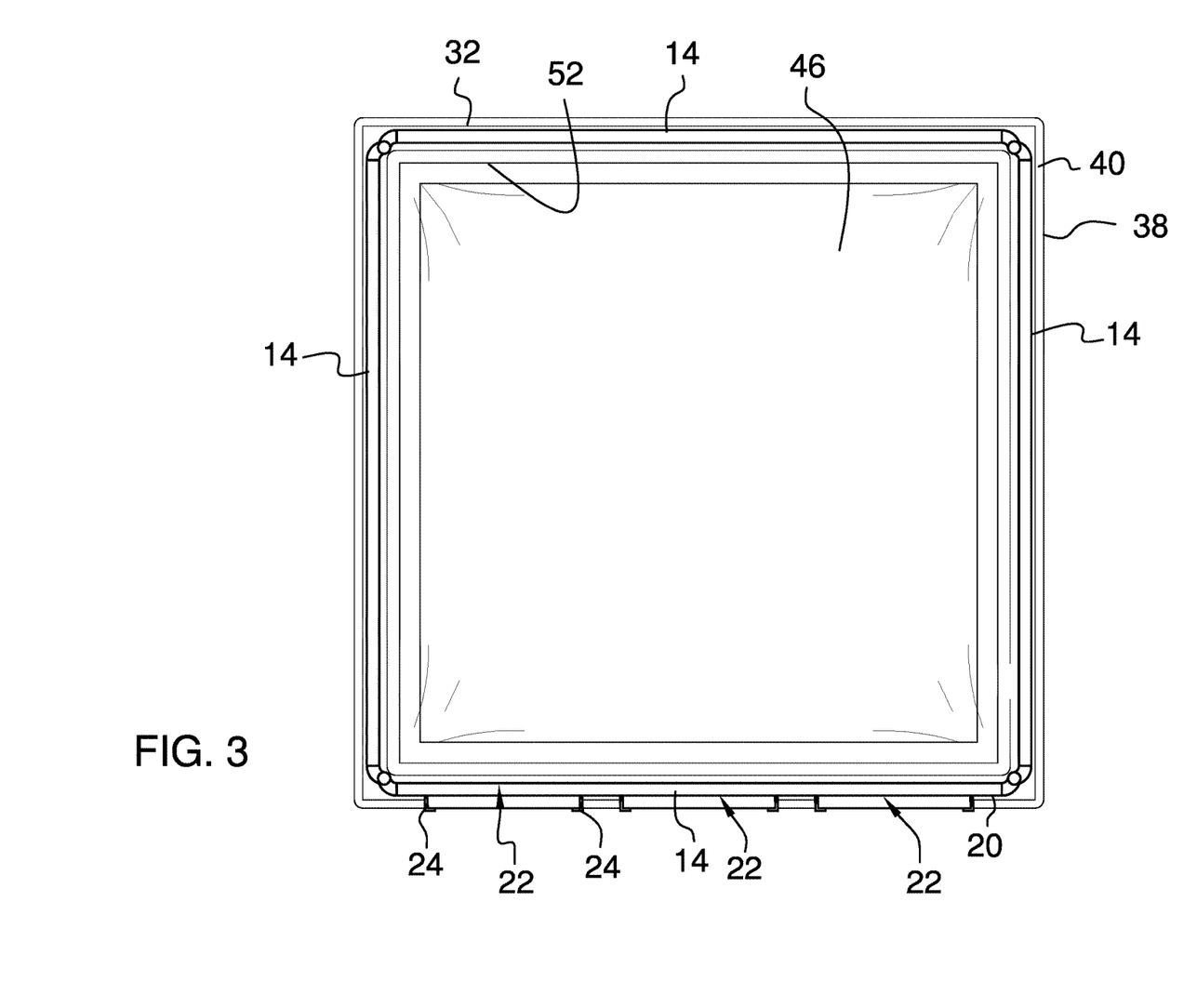
FIG. 3 is a top view of an embodiment of the disclosure.
Figure 4:
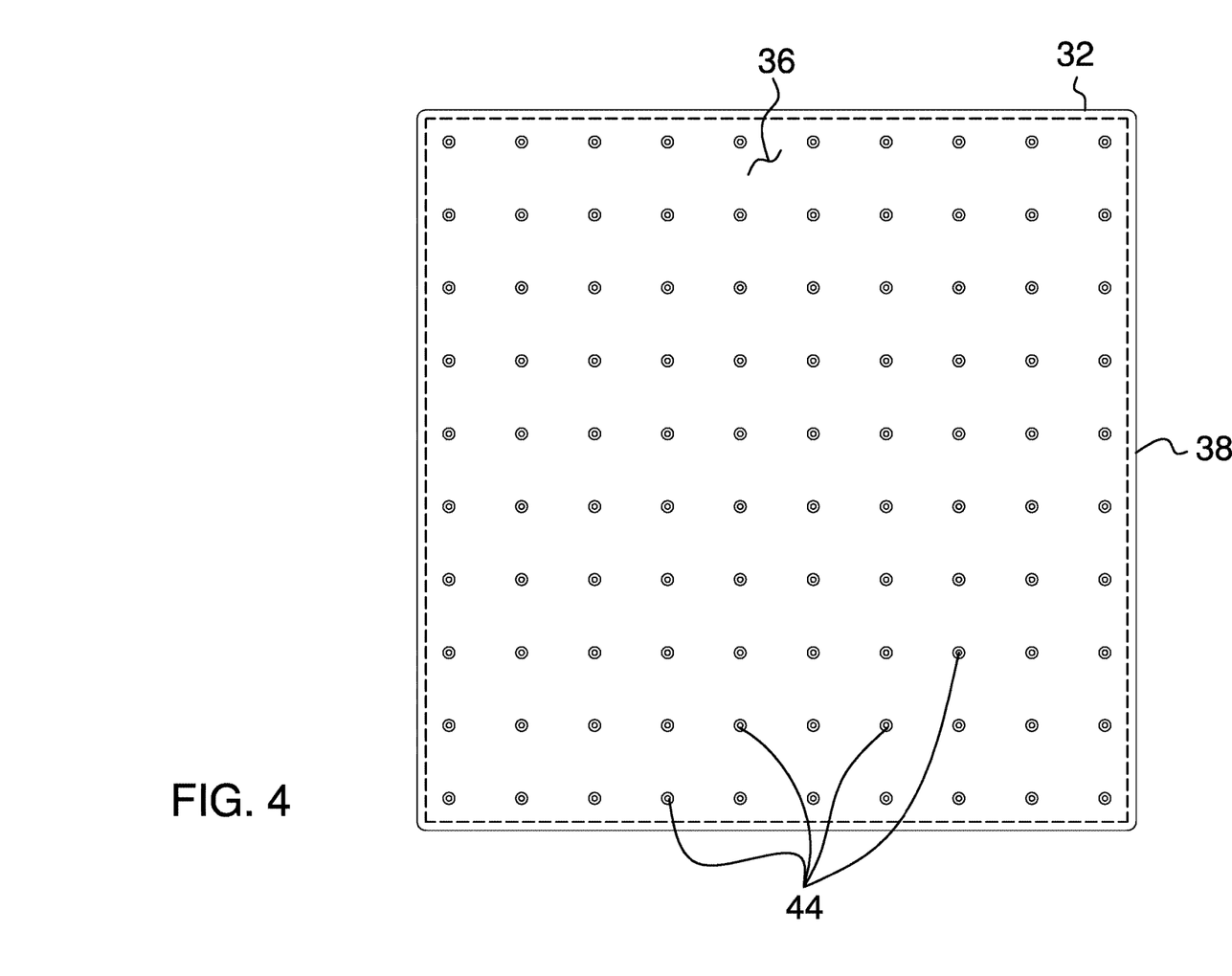
FIG. 4 is a bottom view of an embodiment of the disclosure.
Figure 5:
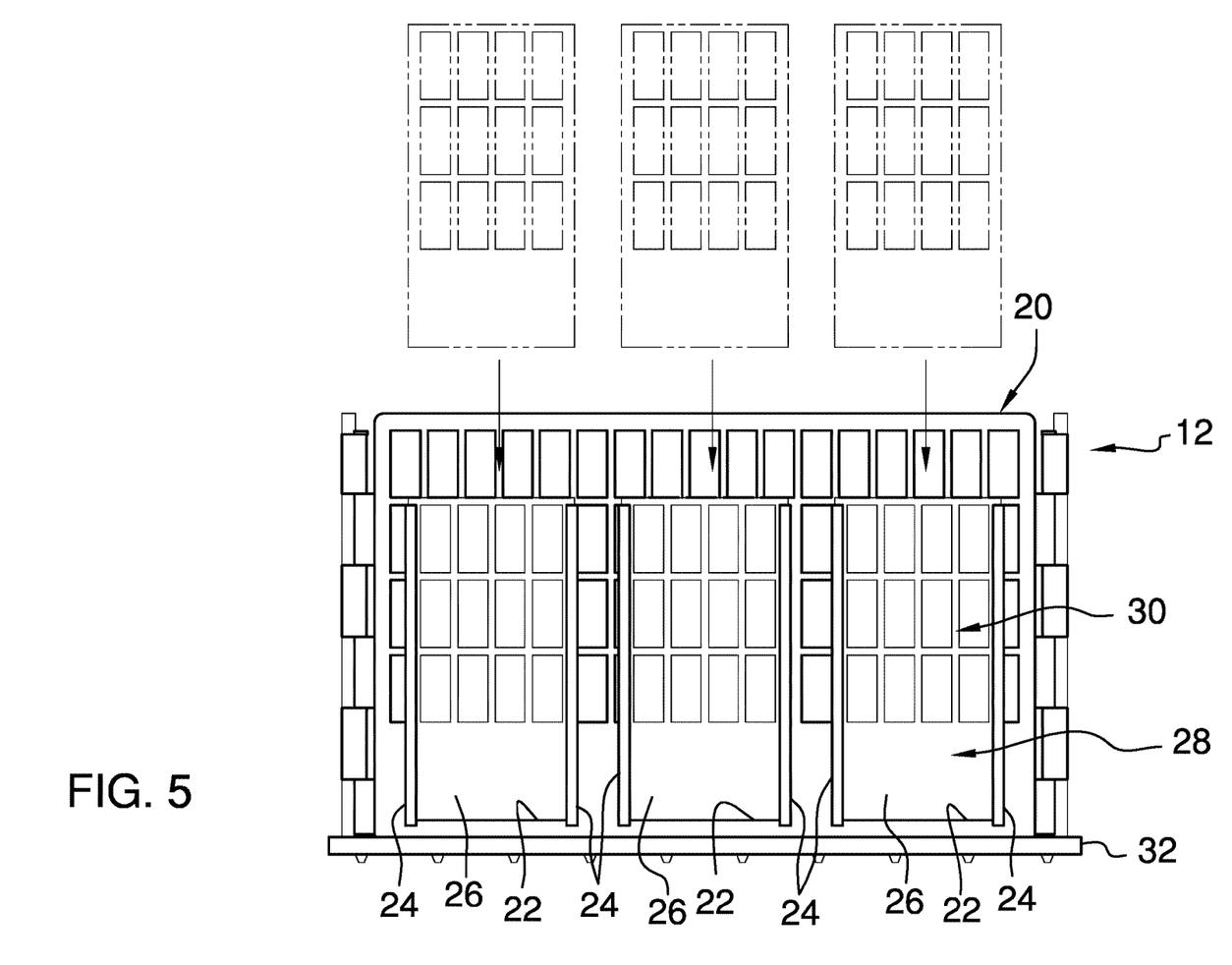
FIG. 5 is a front view of an embodiment of the disclosure.
Figure 6:
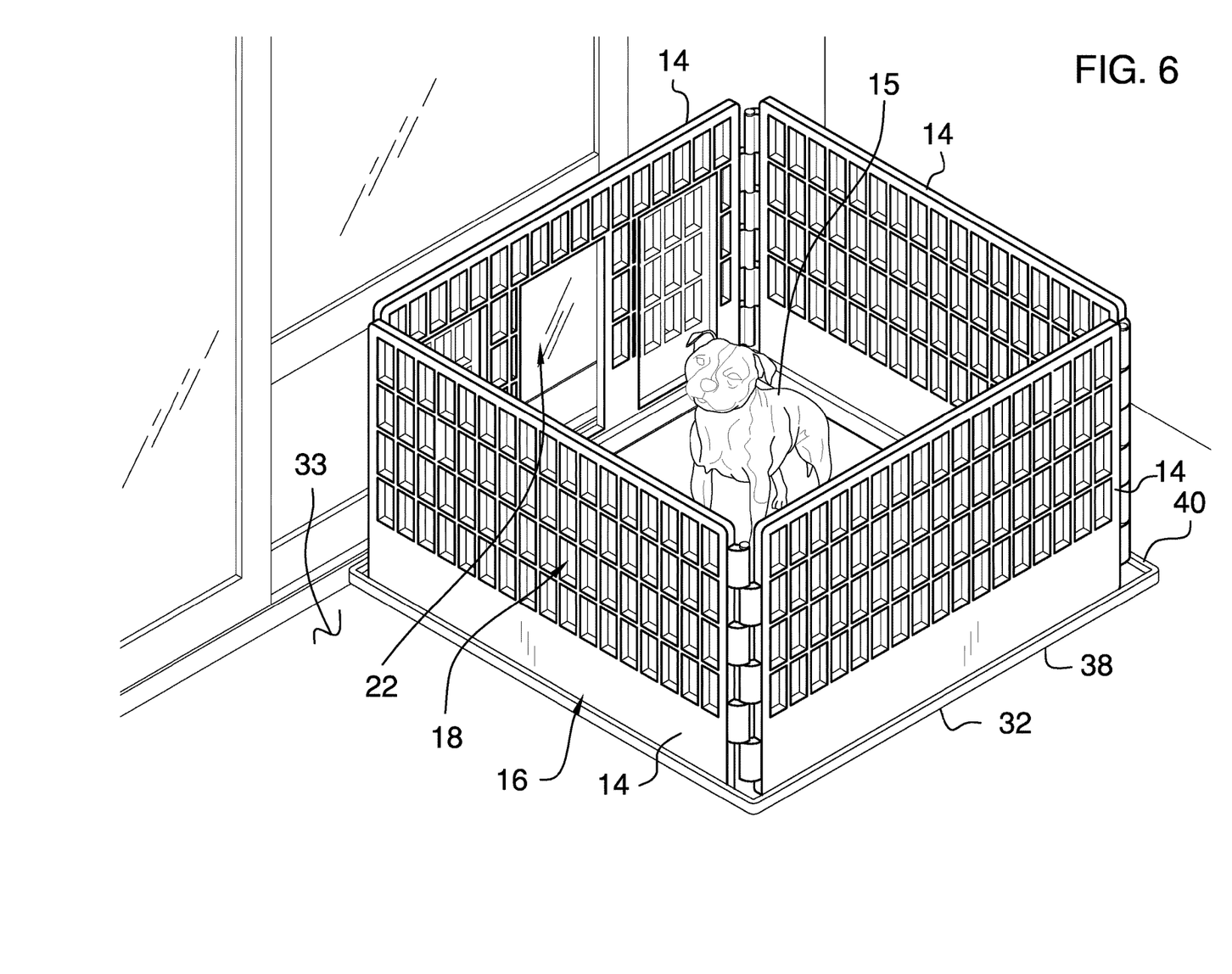
FIG. 6 is a perspective in-use view of an embodiment of the disclosure.

With reference now to the drawings, and in particular to FIGS. 1 through 6 thereof, a new pen device embodying the principles and concepts of an embodiment of the disclosure and generally designated by the reference numeral 10 will be described.

As best illustrated in FIGS. 1 through 6, the pet pee pad pen assembly 10 generally comprises a pen 12 which comprises a plurality of walls 14 being hingedly coupled together. Thus, the pen 12 forms a rectangular shape to shelter an animal 15, such as dog, a cat or other domesticated animal 15. Each of the plurality of walls 14 has a lower portion 16 and an upper portion 18. The lower portion 16 is solid and the upper portion 18 is foraminous. The plurality of walls 14 includes a first wall 20 and the first wall 20 has a plurality of openings 22 each extending therethrough to facilitate the animal 15 to enter or exit the pen 12. The lower portion 16 of each of the walls 14 inhibits urine from a male dog from passing therethrough when the male dog lifts its leg to urinate.

A plurality of rails 24 is provided and each of the rails 24 is coupled to the first wall 20. Each of the rails 24 is vertically oriented and each of the rails 24 is aligned with a respective one of the openings 22 in the first wall 20. A plurality of doors 26 is each removably disposed on the pen 12 and each of the doors 26 is positionable over a respective one of the openings 22. Each of the doors 26 engages a respective pair of the rails 24 for retaining each of the doors 26 over the respective opening 22. Moreover, each of the doors 26 has a bottom portion 28 and a top portion 30; the bottom portion 28 is solid and the top portion 30 is foraminous.

A base 32 is provided and the base 32 can be positioned on a support surface 33, such as a floor in a room or the ground outside. The pen 12 is positioned on the base 32 and the base 32 is comprised of a fluid impermeable material to inhibit pet urine from passing therethrough. The base 32 has a top surface 34, a bottom surface 36 and a perimeter edge 38 extending therebetween, and the base 32 has a lip 40 extending upwardly from the top surface 34. The lip 40 is aligned with and is coextensive with the perimeter edge 38. A bottom edge 42 of each of the walls 14 of the pen 12 rests on the top surface 34 having each of the walls 14 abutting the lip 40. A plurality of cleats 44 is each coupled to the bottom surface 36 to enhance gripping the support surface 33. The cleats 44 are spaced apart from each other and are distributed over the bottom surface 36.

A pad 46 is provided and the pad 46 is positionable on the base 32. The pad 46 is comprised of a fluid absorbent material to absorb the pet urine. The pad 46 has an upper surface 48 and a lower surface 50, and the lower surface 50 rests on the top surface 34 of the base 32. The pad 46 may be infused with a chemical deodorant to reduce odors associated with the pet urine. An insert 52 is positionable on the pad 46 thereby inhibiting the pad 46 from being displaced on the base 32. The insert 52 is comprised of a weighted material and the insert 52 comprises a plurality of intersecting members 54. The intersecting members 54 intersect each other at a perpendicular angle such that the insert 52 forms a rectangular shape. The insert 52 rests on the upper surface 48 of the pad 46 having each of the intersecting members 54 extending along a respective one of the walls 14 of the pen 12.

In use, the base 32 and the pen 12 are positioned in a preferred location when the animal 15 will be unattended for a period of time. The pen 12 can be located next to a secured area, such as a fenced in yard, a balcony or other secure location in which the animal 15 is allowed to urinate or defecate. Respective ones of the doors 26 can be removed to facilitate the animal 15 to move between the pen 12 and the secured area when the animal 15 is unattended. In this way the animal 15 is facilitated to relieve themselves while the animal 15 is unattended. The pen 12 can also be placed indoors 26 and all of the doors 26 can remain in place to inhibit the animal 15 from escaping the pen 12. The pad 46 and the insert 52 can be placed on the base 32 to absorb urine from the animal 15.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A pet pee pad pen assembly for facilitating a pet to relieve themselves over extended periods of time, said assembly comprising:
 a pen comprising a plurality of walls being hingedly coupled together such that said pen forms a rectangular shape wherein said pen is configured to shelter an animal, a respective one of said walls having a plurality of openings each extending therethrough wherein each of said openings is configured to facilitate the animal to enter or exit said pen;
 a plurality of doors, each of said doors being removably disposed on said pen, each of said doors being positionable over a respective one of said openings;
 a base being configured to be positioned on a support surface, said base having said pen being positioned thereon, said base being comprised of a fluid impermeable material wherein said base is configured to inhibit pet urine from passing therethrough, wherein said base has a top surface, a bottom surface and a perimeter edge extending therebetween, said base having a lip extending upwardly from said top surface, said lip being aligned with and being coextensive with said perimeter edge, a bottom edge of each of said walls of said pen resting on said top surface having each of said walls abutting an interior face of said lip;
 a pad being positionable on said base, said pad being comprised of a fluid absorbent material wherein said pad is configured to absorb the pet urine; and
 an insert being positionable on said pad thereby inhibiting said pad from being displaced on said base, said insert being comprised of a weighted material, wherein said insert comprises a plurality of intersecting members intersecting each other at a perpendicular angle such that said insert forms a rectangular shape, said insert resting on said pad having each of said intersecting members being inset from and extending along a respective one of said walls of said pen.

2. The assembly according to claim 1, wherein each of said plurality of walls has a lower portion and an upper portion, said lower portion being solid, said upper portion being foraminous, said plurality of walls including a first wall, each of said openings extending through said first wall.

3. The assembly according to claim 2, further comprising plurality of rails, each of said rails being coupled to said first wall, each of said rails being vertically oriented, each of said rails being aligned with a respective one of said openings in said first wall.

4. The assembly according to claim 3, Wherein each of said doors engages a respective pair of said rails for retaining each of said doors over said respective opening, each of said doors having a bottom portion and a top portion, said bottom portion being solid, said top portion being foraminous.

5. The assembly according to claim 1, wherein said bottom surface has a plurality of cleats each being coupled thereto wherein each of said cleats is configured to enhance gripping the support surface, said cleats being spaced apart from each other and being distributed over said bottom surface.

6. The assembly according to claim 1, wherein said pad has an upper surface and a lower surface, said lower surface resting on said top surface of said base.

7. A pet pee pad pen assembly for facilitating a pet to relieve themselves over extended periods of time, said assembly comprising:
 a pen comprising a plurality of walls being hingedly coupled together such that said pen forms a rectangular shape wherein said pen is configured to shelter an animal, each of said plurality of walls having a lower portion and an upper portion, said lower portion being solid, said upper portion being foraminous, said plurality of walls including a first wall, said first wall having a plurality of openings each extending therethrough wherein each of said openings is configured to facilitate the animal to enter or exit said pen;

a plurality of rails, each of said rails being coupled to said first wall, each of said rails being vertically oriented, each of said rails being aligned with a respective one of said openings in said first wall;

a plurality of doors, each of said doors being removably disposed on said pen, each of said doors being positionable over a respective one of said openings, each of said doors engaging a respective pair of said rails for retaining each of said doors over said respective opening, each of said doors having a bottom portion and a top portion, said bottom portion being solid, said top portion being foraminous;

a base being configured to be positioned on a support surface, said base having said pen being positioned thereon, said base being comprised of a fluid impermeable material wherein said base is configured to inhibit pet urine from passing therethrough, said base having a top surface, a bottom surface and a perimeter edge extending therebetween, said base having a lip extending upwardly from said top surface, said lip being aligned with and being coextensive with said perimeter edge, a bottom edge of each of said walls of said pen resting on said top surface having each of said walls abutting an interior face of said lip, said bottom surface having a plurality of cleats each being coupled thereto wherein each of said cleats is configured to enhance gripping the support surface, said cleats being spaced apart from each other and being distributed over said bottom surface;

a pad being positionable on said base; said pad being comprised of a fluid absorbent material wherein said pad is configured to absorb the pet urine, said pad having an upper surface and a lower surface, said lower surface resting on said top surface of said base; and an insert being positionable on said pad thereby inhibiting said pad from being displaced on said base, said insert being comprised of a weighted material, said insert comprising a plurality of intersecting members intersecting each other at a perpendicular angle such that said insert forms a rectangular shape, said insert resting on said upper surface of said pad having each of said intersecting members being inset from and extending along a respective one of said walls of said pen.

* * * * *